March 24, 1959     P. BARAN     2,879,501
NULL-RESPONSIVE RATIO-MODULATION MULTIPLEX
DATA TRANSMISSION SYSTEMS Filed April 30, 1953     4 Sheets-Sheet 1

INVENTOR.
Paul Baran
BY Darby & Darby
ATTORNEYS.

Fig. 3.

March 24, 1959  P. BARAN  2,879,501
NULL-RESPONSIVE RATIO-MODULATION MULTIPLEX
DATA TRANSMISSION SYSTEMS
Filed April 30, 1953  4 Sheets-Sheet 3

INVENTOR.
Paul Baran
BY Darby & Darby
ATTORNEYS.

INVENTOR.
Paul Baran
BY Darby & Darby
ATTORNEYS.

2,879,501
Patented Mar. 24, 1959

2,879,501

**NULL-RESPONSIVE RATIO-MODULATION MULTI-
PLEX DATA TRANSMISSION SYSTEMS**

Paul Baran, New York, N.Y.

Application April 30, 1953, Serial No. 352,246

26 Claims. (Cl. 340—182)

The present invention relates to improvements in telemetering systems for transmitting to a remote point data produced or existing at a local point, and is further concerned with improvements in transmitters, receivers, indicators, recorders and other portions of said systems.

Telemetering systems have a wide variety of uses in many fields where the remote indication of data is desirable. One particular application to which the present invention is especially directed involves the transmission of such data from an airborne unit to either a further airborne unit or to a ground unit. In such systems, the airborne unit or transmitter must be of simple and reliable design and of small size, cost, and weight, requiring no careful adjustments or calibration and operable by relatively low skilled personnel. It further must have good long-time stability, must include a plurality of channels over which separate sets of data or intelligences may be transmitted, and whose input need only be the positioning of a mechanical element or shaft. Uses for such systems include remote control of aircraft from another aircraft or from the ground, remote weather station data transmission to ground stations or aircraft in flight, and transmission of data from dangerous locations where the data is produced to relatively safe indicator or recorder locations, such as in military installations or in extreme temperature or pressure industrial processes. Other uses include various types of supervisory control or remote reading systems, such as along oil, gas or power lines, or between weather stations.

As one example, for indicating at a remote point the operation of a drone aircraft, the remote control operator may require a variety of data, such as, for example, air speed, altitude, heading, pitch, bank, fuel quantity, and guidance signal strength. All of these data would have to be transmitted simultaneously and simply to a remote point from which the drone aircraft may be controlled.

The present invention provides such a system and eliminates the necessity of careful adjustments by highly skilled personnel and improves stability and reliability by avoiding dependence upon non-linear vacuum tube characteristics or absolute voltage levels, but rather relies upon a linear system of ratio-modulation whose accuracy is not affected to any first order by such factors as vacuum tube aging, power supply variation, temperature drift, and so forth, which are troublesome factors in present conventional telemetering systems, while at the same time having small size and weight, and reduced complexity.

One important feature of the present invention resides in the provision of particular means for avoiding a high degree of frequency dependence, such as has been characteristic of multiple data transmission systems in the past. The respective data signals being transmitted are of different frequency, preferably of audio frequency. Even though two component signals of each frequency are required for full determination of the data transmitted, only one tuned receiver filter is needed for each data signal frequency, by virtue of the use of a receiver synchro excited by all component signals being transmitted, to produce a single data-representative signal for each such frequency.

In addition, substantially all amplitude-dependence is eliminated, avoiding another possible critical condition, by relying upon ratio-modulation at the transmitter and upon null-indication or detection at the receiver.

Another feature of the present invention resides in the provision of particular means for avoiding the necessity of synchronization in a time-division multiple signal transmission system. In conventional systems for transmitting a plurality of signals on a time-division basis, it has been necessary to synchronize the receiver operation accurately to the transmitter, to assure proper separation of the several signals at the receiver. In the present system this is not necessary, and consequently great simplification and avoidance of critical conditions is accomplished, by virtue of the use of an electronic switch whose separate input channels are differently biased to produce respectively different modulation envelopes, at different levels of amplitude, separable at the receiver merely by biased clippers.

Other advantages and objects of the present invention will become more readily apparent by consideration of the following detailed description of a preferred embodiment thereof, taken in conjunction with the appended drawings, in which.

In the following, a system is described for transmission of three independent data; however, it will be readily appreciated that this number is merely illustrative, and the system may incorporate any desired number of such data.

Referring to the drawings, there are shown a plurality of oscillators 11, 12 and 13 of any suitable conventional design, preferably producing respectively different output frequencies in the audio frequency range, such as between 500 and 1,000 cycles per second. For illustrative purposes, oscillator 11 may produce a 500-cycle output frequency A, oscillator 12 a 600-cycle output frequency B, and oscillator 13 a 700-cycle output frequency C. The outputs of these oscillators are supplied to respective synchronous position transmitters or synchros 14, 15 and 16, which may be of the conventional "selsyn," "autosyn" or similar type, each comprising a rotatable single phase winding 14a, 15a and 16a, respectively, and a stationary polyphase winding 14b, 14c, 14d; 15b, 15c, 15d; 16b, 16c, 16d, respectively. The synchros are preferably lightly loaded, and hence remain linear in characteristics. Although synchros are used in illustration, this system is by no means limited to such devices. Resolvers, strain gages, differential transducers, etc., may also be used, as indicated below. The outputs of oscillators 11, 12 and 13 are supplied respectively to the single-phase rotatable windings 14a, 15a and 16a. As indicated schematically at 17, 18 and 19, these windings are rotatable in response to respective control members 17, 18 and 19 which may be manual controls settable at the will of an operator or may be coupled to meter movements or control members whose position it is desired to indicate remotely. The positioning of control members 17, 18, and 19 forms the three data to be transmitted.

Each of the polyphase windings of the transmitters 14, 15 and 16 has one winding 14d, 15d, 16d grounded as at 21, a second winding 14b, 15b, 16b, connected through resective isolating or matching resistors 22, 23, 24 to a first channel I designated as 26, and a third winding 14c, 15c, 16c connected through similar isolating or matching resistors 27, 28 and 29 to a second channel II designated as 31.

As is well known, in the three polyphase windings of each of these position transmitters 14, 15 and 16, three voltages will be produced, each of the frequency of excitation of the corresponding single phase winding (that is, of the frequency of oscillator 11, 12 or 13, respectively) and of magnitude variable in accordance with the relative position of the rotatable winding with respect to the fixed winding. These voltages also at times are of reversible phase or polarity.

According to one feature of the present invention, these three polyphase winding voltages of each position transmitter are combined into two channels, which it has been found provide sufficient intelligence or information for reproduction of the desired data. Thus, the voltage produced in grounded winding 14d is added to that produced in winding 14b to produce a resultant voltage applied to channel I, while the voltage of grounded winding 14d is added to that of winding 14c to produce a voltage applied to channel II. All of the position transmitters 14, 15 and 16 can be and are coupled to channels I and II in the same manner. Since the mixing resistors 22, 27, 23, 28, 24 and 29 are of high ohmic value compared to the impedances of the synchros 14, 15 and 16, negligible interaction results. This produces two composite data signals, each having a component of each of the frequencies A, B, C, and which contain all of the intelligence necessary to transmit to a remote point the positions of the control members 17, 18 and 19. These two composite signals are relatively immune to variation in circuit conditions, such as changes in output frequency or amplitude of oscillators 11, 12 or 13, or change in other circuit conditions, since only the ratios of these signals are significant at the receiving station.

For the purpose of transmission, channels I and II are coupled to an electronic switch or commutator formed by the tubes 32 and 33, which are preferably of the screen-grid, sharp cut-off type, such as the type 6AS6 tubes. These two tubes are essentially gating or switching tubes whose conductivities are controlled by a multivibrator 34 whose opposite polarity outputs 36 and 37 are supplied respectively to the screen grids of the gating tubes 32 and 33. Tubes 32 and 33 have their control grids coupled respectively to channels I and II, and have respective input or grid leak resistors 38 and 39 to which are applied respective biases indicated by 35, 40. The anodes of these tubes 32, 33 are directly coupled together, and have a common load resistor 41 coupled to a positive potential source 45 and an output condenser 42.

Figure 2:
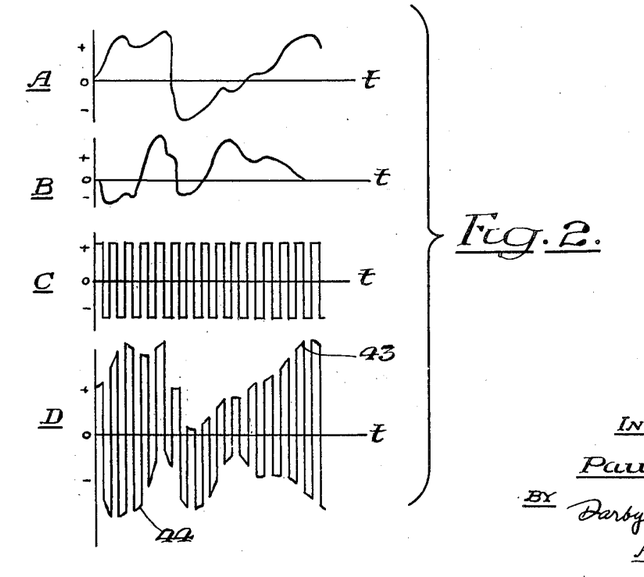
Figure 2 shows various wave forms useful in explaining the operation of the invention.

Multivibrator 34 may be of any conventional design, such as the one shown, and produces an output of wave form such as shown in Figure 2C, formed by a rectangular wave of uniform amplitude. Its frequency is preferably at least ten times as high as the maximum frequency of any of the oscillators 11, 12, 13 used and, for example, might be 15 kilocycles or more, depending upon the allowable band width in the transmission channel to be used.

It will be understood that the alternating current components of output 36 of multivibrator 34 have opposite polarity from that of the other output 37 at any instant, and these outputs are of sufficient magnitude alternately to cut off and to unblock the gating tubes 32 and 33, in opposite phase. When a negative potential is applied from the multivibrator 34 to one of the screen grids, the corresponding gating tube is completely cut off and non-conductive. During the same interval, a positive potential is applied to the screen grid of the other gating tube, which then operates as an amplifier preferably of Class A type. During the following half cycle of the multivibrator output, the polarities are reversed, and the first gating tube conducts while the second gating tube is cut off, and this cycle is repeated continually.

To permit simple transmission, reception and separation of the two composite data signals, the output levels of the tubes 32 and 33 are made widely different by the bias sources 35, 40. For example, referring to Figure 2, the signal applied to channel I might be as shown in Figure 2A, varying above or below a zero or average position designated by 0. Similarly, the signal of channel II might be as represented at Figure 2B. It will be understood that the signals of Figures 2A and 2B are represented by the sum of three signals of respectively different frequencies A, B, C, derived from oscillators 11, 12 and 13, whose amplitudes have been determined by the positioning of the rotors of transmitters 14, 15 and 16 by members 17, 18 and 19. As indicated above, the output of the multivibrator 34 is shown in Figure 2C. By providing respectively different biases for the two gating tubes, to shift the class A operation point of tube 33 or 34, whichever is conducting, the average amplitudes of their output signals will be diffierent. As shown in Figure 2D, the envelope of the upper peaks 43 of the combined electronic switch output signal follows the wave form of channel I shown in Figure 2A, while the envelope of the lower peaks 44 follows the wave form of channel II shown in Figure 2B. The biases provided for tubes 32 and 33 are selected so that there will be no overlap of the respective envelopes 43 and 44. After passing through common output condenser 42, the zero line of the combined output signal will be as shown at 0 in Figure 2D.

While this electronic switch has been shown as applicable to but two channels, which are all that are needed for the present multiple data transmission system, the present multiplex system can be used for other plural data or intelligence transmission, and any desired number of channels can be employed. For more than two channels, a like number of gating tubes is usual, each supplied by one channel signal, and the tubes are gated sequentially in known or desired manner, to produce successive outputs non-overlapping in time. Each gating tube has a separate bias, producing an output level individual to it, each such level constituting an amplitude range from which all other outputs are excluded.

Figure 1:
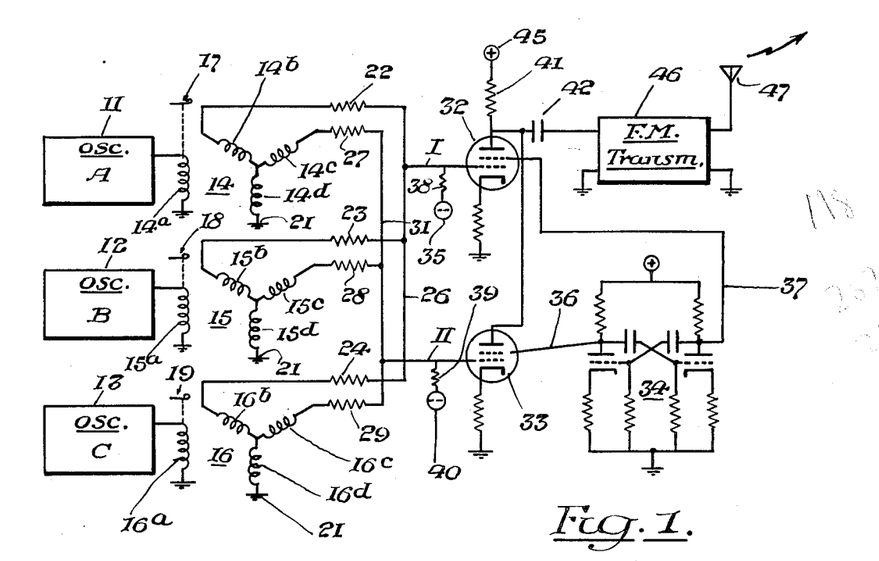
Figure 1 shows a schematic circuit diagram of a preferred embodiment of transmitter station.

This combined signal of Figure 2D may be transmitted to a remote point in any suitable desired manner. For example, it may be directly conducted to a remote point as by a wire connection, or by being recorded and later reproduced. More desirably, it may be modulated upon a carrier and transmitted by transmission line or by radio. In Figure 1, for illustrative purposes, this combined signal is shown as supplied to a frequency modulation transmitter 46 of any suitable conventional type, which modulates the signal upon a carrier and then radiates the modulated carrier from a suitable antenna 47 to the remote point at which the receiver station is located.

Figure 3:
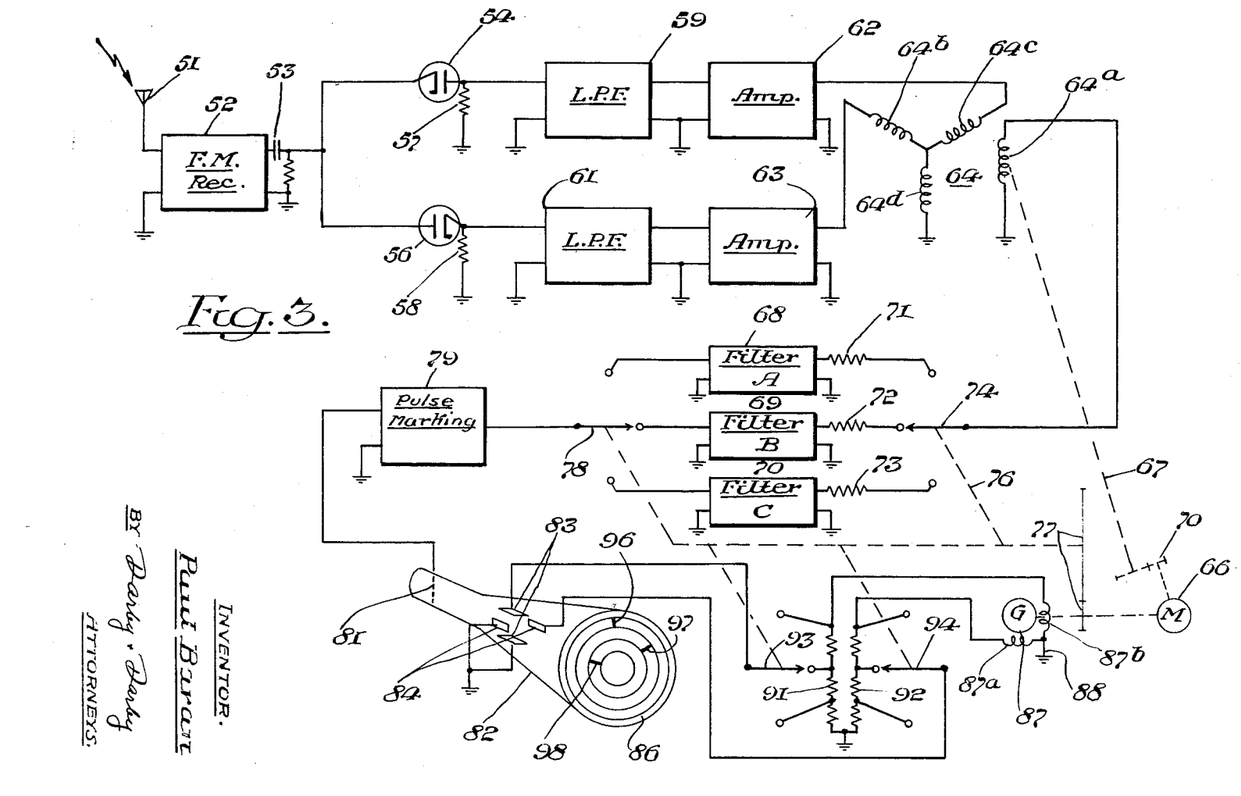
Figure 3 illustrates a schematic diagram partially in block form of a preferred embodiment of receiver station, including a specific indicator or "read-out" device.

As shown in Figure 3, at the receiver station the radiated signal is picked up by a suitable antenna 51, by which it is supplied to a similar receiver 52 which includes a demodulator in its output, whereby at the lead 53 a faithful version of the original combined signal of Figure 2D is reproduced. It will be understood that any other means of providing this reproduced signal at the receiver location may be utilized, as expedient. The signals of the two channels I and II may be transmitted in any other desired way, such as separate carriers, separate sub-carriers, separate wire or radio links, frequency multiplexing, phase multiplexing, amplitude multiplexing, etc. This signal is supplied to a pair of biased clippers shown as respective diodes 54 and 56 coupled in reverse fashion to the common lead 53. In this manner, diode 54 permits only the negative portions of the combined signal to pass, developing the lower portion of the signal of Figure 2D across its load resistor 57. Diode 56 permits only the positive portions of the combined signal to pass, developing the upper portion of the combined signal across load resistor 58. It will be understood that any other form of signal separation circuit based upon amplitude discrimination may be used.

Where more than two channels are transmitted, with respective amplitude ranges, the separating means is slightly more complicated. However, separation is readily effected by successive pairs of biased clippers. Thus, the first pair are biased so that one passes only the largest amplitude signal, and the other passes all other signals. The output of the other is then fed to a second pair of similar biased clippers, one biased to pass only the largest-amplitude signal remaining, and the other biased to pass all the rest. By successive pairs of clippers, repeating this arrangement to the extent needed, all signals are separated. However, in the present preferred data transmission system, extreme simplification is obtained since only two signals require separation.

These respective separated signals are then supplied to a pair of low pass filters 59, 61 which suppress any components of the frequency of the multivibrator 34 or higher, leaving only the signals of Figures 2A and 2B at their outputs. These filters are, of course, not critical as to frequency or attenuation. These filtered signals are further amplified in respective amplifier or driver circuits 62 and 63, whose outputs are then supplied to a receiver scanning synchro 64 having a rotatable single phase winding 64a and polyphase-connected windings 64b, 64c and 64d connected in Y fashion. Winding 64d is grounded, the output of amplifier 62 is connected across the series circuit formed by the windings 64c and 64d, and the output of amplifier 63 is connected across the series connection of windings 64b and 64d.

In this manner, according to one feature of the present invention, a voltage is developed across winding 64a having components of frequencies A, B and C, each component having an amplitude and phase sense or polarity dependent upon the relationship between (1) the position of rotor 64a relative to its polyphase winding and (2) the position of the transmitter rotor for that component relative to its polyphase winding. Considering a single frequency component of the excitation of the synchro 64, such as, for example, the frequency A of oscillator 11, and ignoring for the moment the other components of this excitation of frequency B or C, it will be understood that when rotor 64a is positioned relative to its stator in correspondence with the positioning of rotor 14a of transmitter synchro 14 relative to its stator, then the excitation of rotor 64a at the frequency A will be zero, this being a null position. If the rotor 64a is rotated, its excitation of frequency A will increase sinusoidally to a maximum at the 90° position, then drop similarly to a null at the 180° position, and then reverse in polarity, still changing sinusoidally in the same manner until it comes back to the original null after one complete revolution. It will be understood that for each of the other frequency components B and C this same action takes place, so that at each component frequency there will be two null positions of the rotor 64a, these null positions being determined only by the positions of the controlling members 17, 18 and 19 at the transmitter station.

The present invention also provides a simple and reliable method of segregating these various components and utilizing them to indicate the respective data represented thereby. The scanning synchro rotor 64a is rotated continuously at a relatively low speed, such as the order of ten revolutions per second, from a motor 66, the mechanical connection therebetween being illustrated schematically by the dashed line 67 and gearing 70. In this way, for each component frequency A, B or C the rotor 64a output passes through a zero value or null twice per revolution, the rotor positions for these nulls being independently determined by the data being transmitted.

Also provided are a plurality of pass filters 68, 69 and 70, each adapted to pass only a single one of the oscillator frequencies A, B and C. These filters 68, 69 and 70 have their input terminals coupled through respective isolating or matching resistors 71, 72 and 73 to a commutator schematically illustrated at 74. This commutator is driven by a mechanical connection 76 and reduction gearing 77 from the motor 66 at a rate such that its moving contact or brush remains in contact with each segment for a period equal to one complete revolution of the synchro rotor 64a. The outputs of the filters 68, 69 and 70 are similarly connected to a commutator 78 with a contact or brush rotated synchronously with commutator 74, the net effect of the two commutators 74 and 78 being to connect sequentially in circuit each of the filters 68, 69 and 70, only one being connected in circuit at any one time and for a period equal to one complete revolution of the synchro rotor 64a. In this manner, only one frequency component at a time of the composite signal induced in the rotor 64a is passed onto the indicator circuit to be described, thereby separating the respective components and permitting independent and separate indication of the data represented by such frequency components.

It will be seen that complete separation of the respective data signals is produced by but one set of filters, minimizing entirely the question of frequency drift, the amplitude and phase shift characteristics of the filters being immaterial. It should be noted that, if frequency separation were attempted at the outputs of driver amplifiers 62, 63, two filters for each frequency would be needed, and these two filters would have to be accurately matched as to pass frequency and phase-shift and drift characteristics to avoid distorting the relative magnitudes of the signals of the two channels, whose ratio determines the data being transmitted.

The movable contact of commutator 78 is connected to a pulse marking circuit 79 which is adapted to produce a single uniform amplitude rectangular pulse at the instant that the signal supplied thereto passes through a null or zero. This circuit is a conventional one shown for example in the book Electronic Instrumentation by Greenwood, Holdan and MacRae, MIT Radiation Laboratory Series, volume 21, McGraw-Hill, 1948, at page 183. The output of the pulse marking circuit 79 is coupled to the intensity control electrode or grid 81 of a cathode ray tube indicator 82 of conventional type. For illustrative purposes, it is shown as having a pair of vertical deflecting electrodes 83 and a pair of horizontal deflecting electrodes 84 as well as a front viewing face or screen 86, preferably of long persistence. Magnetic deflection could be used if desired.

For the purpose of producing multiple indications on the indicator face 86, a two-phase generator 87 is provided, driven by the motor 66 at twice the speed of the synchro rotor 64a. The generator 87 has respective windings 87a and 87b, one terminal of each being grounded at 88. The other terminals are connected to respective voltage dividers 91, 92, each having taps coupled to the fixed terminals or segments of respective commutators 93, 94 which are rotated at the same rate as the commutators 74 and 78. As is well known, if two-phase voltages are applied to the respective deflecting means of a cathode ray tube in equal amplitude, a circular trace is formed on the tube face such as 86. The commutators 93 and 94 serve to provide three separate levels of such deflecting voltages, and vary the vertical and horizontal voltages simultaneously, each voltage level persisting during the same interval that a particular filter 68, 69 or 70 remains connected in circuit. As a result, there are provided sequentially on the tube face 86 three separate circular traces of respectively different diameter. Preferably, the tube electron gun (not shown) is biased in conventional manner so that the trace is invisible except when an intensifying pulse is impressed on the intensity control electrode 81 as from the pulse circuit 79. Alternatively, a normally faintly visible trace may be provided, whose intensity is momentarily increased by the output pulse from circuit 79.

The result is that during a first revolution of synchro rotor 64a, filter 68 of frequency A may be connected in circuit, and maximum voltage is applied to the deflecting electrodes 83, 84, producing a maximum diameter trace. When the frequency component A excited in rotor 64a passes through zero, a pulse is produced in circuit 79 which intensifies the trace to produce a bright spot such as 96. During the next revolution of rotor 64a, commutators 74, 78, 93 and 94 step to the next segment or contact, and connect filter 69 of frequency B in circuit, and at the same time provide an intermediate level of deflecting voltage for tube 82 producing an intermediate-diameter trace. Then during the null of frequency B a similar indication 97 is produced. Similarly, for the following revolution of rotor 64a, filter 70 of frequency C is substituted in the circuit and the lowest deflecting voltage is applied, producing a smallest diameter trace. Again at the null of frequency C a pulse is provided which in turn produces the indication 98. It will be understood that the face 86 of the cathode ray tube 82 may be suitably marked with concentric circles to designate the respective signals and may bear suitable calibrating indicia as desired. Any suitable way of indicating the arcuate position of the traces 96, 97 or 98 may also be used.

In this way, a plurality of separate data determined by the positions of the control elements 17, 18 and 19 are converted into respectively different-frequency electrical signals occurring in pairs, each pair being produced by a single synchro 14, 15 or 16 with an amplitude ratio representing its controlling data, and being of the same frequency as its pair mate but differing from the frequencies of the other pairs. These pairs of signals are combined into two composite channel signals each containing a component from one member of each pair and each channel signal being a composite of various frequencies. These two composite signals are then transmitted to the receiving station. According to the preferred embodiment just described, this is done by an electronic commutation or switching arrangement by which both composite signals can be transmitted as a combined signal over a single channel illustrated as a radio channel, although it will be clearly understood a wire carrier channel or direct channel could also be used where appropriate or desirable.

It will be clear that the present system is relatively immune to circuit changes. Thus, any drift in frequency of oscillators 11, 12, 13 is immaterial, so long as it does not exceed the capacity of pass filters 68, 69 or 70. Changes in amplitude or phase shifts are also immaterial, since only the ratio of signals is relied upon. Thus, there is nothing in the system requiring any critical adjustment.

Furthermore, there is no need for synchronizing any operation at the receiver with action at the transmitter, since the receiver operates solely in response to the data representative signals reproduced by it.

Where continuous 360° indication is desired, the input control members 17, 18, 19 may be coupled to their respective rotors through 2:1 gear trains, producing 180° rotor rotation for 360° control rotation. At the receiver, the generator 87 then makes a complete revolution for each half revolution of rotor 64a, thereby providing full 360° indication of the control member positions.

It is also to be understood that the present invention is not necessarily limited to the use of electronic commutation, but the two composite signals in channels I and II could, where desired, be sent to the receiving station over separate channels, again either wire, carrier or radio channels, in which case, of course, the electronic commutator tubes 32, 33, the multivibrator 34 and the clippers 54, 56 with their appropriate circuits could be omitted, the two composite signals being applied to the receiver scanning synchro 64 in the same manner as shown in Figure 3. The indicator system at the receiver then provides a simple way of separately indicating the data for each intelligence or signal being transmitted.

Figures 4, 5A, 5B, 6, 7:
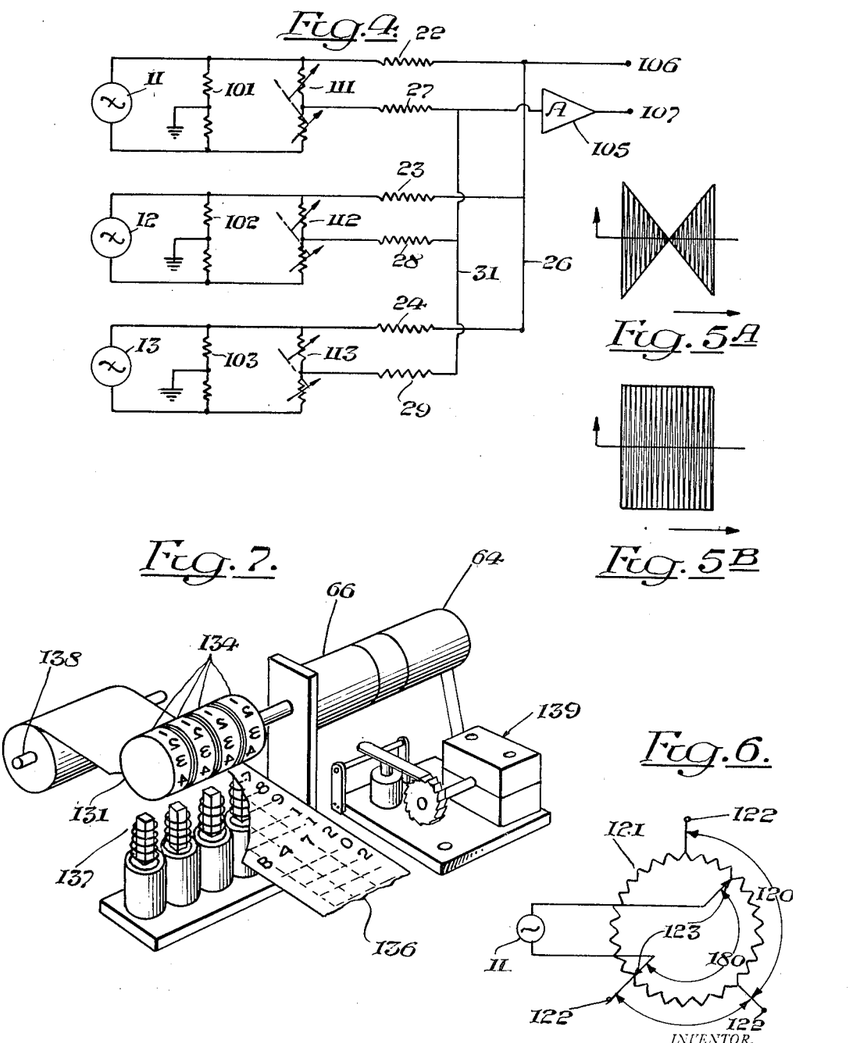
Figure 4 is a schematic circuit diagram of an alternative transducer arrangement at the transmitter station.
Figures 5A and 5B illustrate wave forms useful in explaining Figure 4.
Figure 6 shows a schematic circuit diagram of a further alternative transmitter station transducer.
Figure 7 shows a perspective partially diagrammatic view of an alternative indicator adapted to provide a printed digital or literal record.

As indicated above, the present invention is not limited to the specific type of transducer means for converting the data signals into ratio-modulated electrical signals, since many types of such transducer means may be used. Figure 4 illustrates another form which such transducers may take. In this figure, the oscillators 11, 12, 13 are coupled across respective center-tapped impedances (resistors, inductors, capacitors or combinations thereof) designated at 101, 102 and 103, whose center-taps are each grounded. Also coupled across oscillators 11, 12, 13 are respective transducers 111, 112, 113, which may, for example, be differentially variable rheostats, strain gages, differential magnetic gages, or the like. As shown, a signal proportional to the full oscillator output is coupled from each oscillator 11, 12, 13 through load resistors 22, 23, 24, to channel I designated at 26. The outputs of transducers 111, 112, 113 are coupled to channel II, designated as 31, through similar load resistors 27, 28, 29.

The signal output for each transducer 111, 112 or 113 as a function of signal data input is as shown in Figure 5A, yielding this wave form at channel I. The wave form at channel II is as at Figure 5B, that is, unvarying as a function of input signal data. The signal data is then represented by the ratio of the two channel signals, as desired.

Since such transducer devices may be linear only over a small range, and may yield relatively small output, as shown in Figure 5A, the composite signal of channel II is amplified by a suitable stable feedback amplifier 105 of flat amplitude response. The composite signals of channels I and II appearing at points 106, 107 are then transmitted as discussed above, and utilized at the receiver as shown in Figure 3, using a scanning synchro as described above. This system has the great advantage of requiring only a single amplifier 105 for all channels.

Figure 6 shows another form of transducer useful in Figure 1. In this case, the transducer is in the form of a uniform circular resistor or inductor 121 having three equally spaced fixed taps 122 and two oppositely arranged movable taps 123 across which the oscillator such as 11, 12 or 13, is coupled. This transducer is similar to what has been termed a "D.C. synchro." The output is derived from terminals 122, coupled in the system in the same manner as the polyphase windings of the transducers of Figure 1. The input signal data act to position the variable taps 123 to determine the position-representative outputs.

It will also be understood that the present invention is not necessarily limited to the specific indicator shown, although this is a preferred embodiment, and other indicators, including other methods of separating the respective frequency components of the resultant composite signal induced in the synchro rotor 64a, could also be used.

Figures 7, 8, 9 and 10 illustrate different forms of indicator or "read-out" which may be used in the system of Figures 1 and 3. In Figure 7 there is illustrated a printing recorder or read-out suitable for digital or alphabetical (literal) presentation. A rotary print drum 131 bearing the digits or letters to be printed, is rotated continuously by motor 66 together with scanning synchro 64 corresponding to synchro 64 of Figure 2. Drum 131 is shown as having a plurality of printing rolls 134, each corresponding to one digit or letter of the record to be made. A paper tape 136 to be printed upon is fed between drum 131 and a series of solenoid-operated strikers 137. Considering the tape 136 for the solenoids 137 as stationary, a control circuit 139 is provided including a marking pulse circuit 79 as in Figure 2, so that when the marking pulse is produced, a first solenoid is energized to strike the paper against a first print roll 134 to print one digit. At that instant the position of the roll 134 is phased so that the desired digit is opposite the paper 136. A stepping relay circuit or commutator in apparatus 139 sequentially energizes the solenoids on successive revolutions of the scanning synchro 64, so that the successive digits are thus printed side by side. After a complete sequence of digits is printed, the tape 136 is advanced to the next position to receive the next series of digits. Alternatively, each of the solenoids 137 could be sequentially actuated in synchronism with the switching of filters 68, and each of the inputs 17, 18, 19 of Figure 1 could represent one digit or letter of the data being transmitted.

This same system could be used for punching I.B.M. or similar cards directly from received data, by substituting a punch arrangement for each striker, eliminating the first roll, and passing the card through the punch in synchronism with the motor rotation so that the position of the punch relative to the card is determined by the synchro null.

Figure 8:
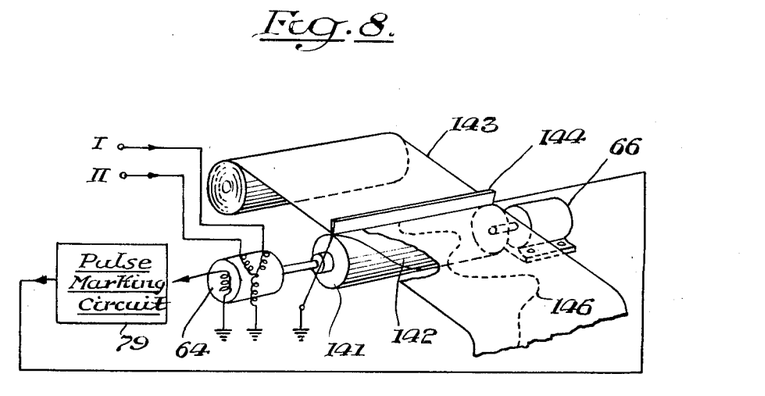
Figure 8 is a diagrammatic view of another alternative recording indicator.

Figure 8 shows a facsimile type recorder, for a single data channel. Motor 66 drives scanning synchro 64 and a non-conductive cylinder 141 having a grounded helical conductor 142 imbedded therein. An electro-sensitive paper 143 continuously passes over cylinder 141 and under a marking bar 144 coupled to the output of marking circuit 79 coupled to synchro 64. Hence, at the instant synchro 64 passes through a null, circuit 79 produces a pulse which causes an arc-over between bar 44 and helical conductor 142, through paper 143 which thus receives a spot indication. As motor 66 rotates continuously, and paper 143 is fed continuously, the result is a series of spots 146 which define a continuous curve, recording the transmitted data. This facsimile recorder may, for example, assume the form commercially produced by Alden Products Company. Conductor 142 may be formed by a painted metallic line, whose curve can be selected to compensate for any non-linearity of the transmitter transducer, or to inject any desired variations from direct linear reproduction. Where multiple channels are used, the pulse marking circuit may be switched sequentially to a plurality of such recorders, or each filter 68 of Figure 3 may be coupled to its own marking circuit coupled to its own facsimile recorder of this type.

Figure 9:
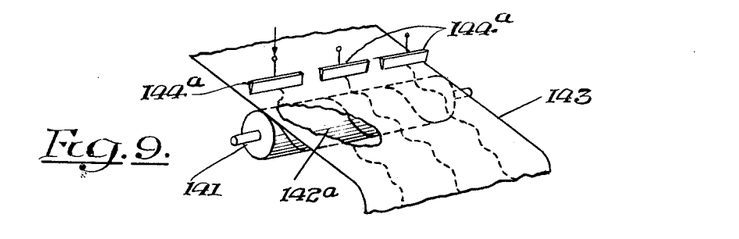
Figure 9 is a similar diagrammatic view of a further alternative recording indicator.

Alternatively, the system of Figure 9 may be used for making a plural recording on paper 143. Here cylinder 141 has a plurality of conductive grounded helices 142a, each having a separate marking bar 144a cooperating therewith, these bars being sequentially coupled to the output of marking circuit 79 of Figure 3 in step with the switching of filters 68, so that each bar 144a records respective signal data on respective tracks on paper 143. Alternatively, all filters 68 can be coupled simultaneously to synchro 64, each filter 68 feeding a respective marking circuit 79 coupled to a respective marking bar 144a.

Figure 10:
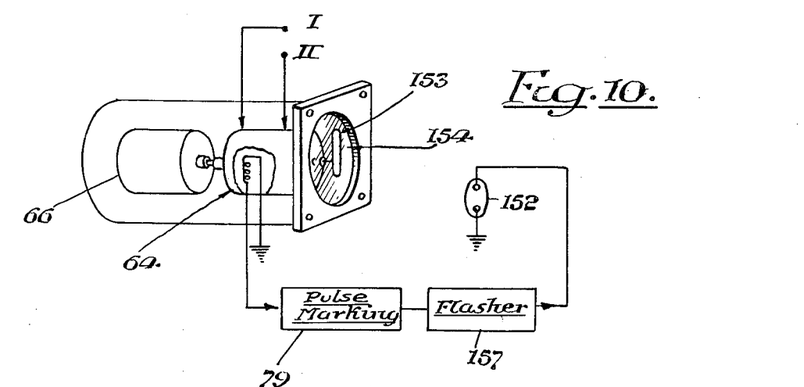
Figure 10 is a diagrammatic view of yet another indicator, for visual reading in simulation of an actual condition-responsive indicator.

Figure 10 shows another optical read-out. Here motor 66 also continuously drives an opaque preferably black pointer 153 in front of a long persistence phosphor screen 154. Marking circuit 79 triggers a flasher circuit 151 of conventional design to excite a strobo-flash lamp 152 on each marking pulse. The lamp flash excites the screen 154 to luminesce except where pointer 153 has cast a shadow, leaving a dark line indication of the signal data transmitted. Here also, multiple data can be readily indicated by separate indicator units sequentially controlled by the marking circuit 79 in step with the commutation of filters 68 of Figure 2, or by plural marker circuits and indicators. The indication in this case resembles a direct view of an aircraft or other instrument.

The present system is particularly adapted for recording of the data signals, either at the transmitter location or at the receiver location. Since the multiple data being transmitted are completely represented by the channel I and II signals, either original or reproduced at the receiver, full recording of all data can be effected on a conventional two-track recorder, such as magnetic tape, disk, photographic, or other type, regardless of the number of separate data being developed. Since all data are represented by amplitude ratios, any amplitude distortion in recording or subsequent reproduction is immaterial. Also, frequency is not critical, and errors caused by tape stretch or by variation in speed of recorder or reproducer are immaterial so long as the pass bands of the separating filters at the indicator are not exceeded. However, in practice this is an immaterial limitation. Since the two recorded tracks are always simultaneously recorded and reproduced, their relationship is invariant, thus eliminating any source of error from the recording or reproducing steps. By thus recording these signals, they may be transmitted to a remote point by physically transporting the record itself, which permits greater flexibility as to time and place of actual indication. Of course, the recorded signals may be reproduced locally as well as remote points.

While the above system has been illustratively described as having three signal intelligences, determined by 17, 18, 19, it will be understood that it may be extended to any number N, merely requiring N transmitter synchros, all coupled to channels I and II as described, with N pass filters and N commutator segments on 74, 78, 92 and 93. The speed of rotation of the scanning synchro 64 will then be N times that of these commutators, and N indicators or indicator scales will be provided.

While the above indicator system illustrates a successive sampling of the various signals, it will be understood that they may be simultaneously indicated if desired, with appropriate modifications of the system, such as by simultaneously separating all frequencies A, B and C, and independently indicating their null values.

The present system is not limited to any particular form of indicator. Other forms of visual indication can readily be devised, and the system can be used directly for actuating a shaft or mechanical member to position it in correspondence with the input data at the transmitter. This can be used for direct dial and pointer indication, for direct control of apparatus in response to the transmitted data, or for direct printing of received data, by electronic or mechanical means.

Where the data to be transmitted is in the form of electrical signals, they may be used to position controls 17, 18, 19 in any desired manner, as by D'Arsonval or other type meter movements or the like.

Alternatively, such signals may be used to disturb the balance of a thermistor bridge excited by the oscillator 11, 12 or 13, so that the output of oscillator frequency is a function of signal voltage. Any non-linearity may be compensated by using the read-outs of Figures 8 or 9.

As a further alternative system, in place of the motor drive for commutators 74 and 78 (and for 93, 94 when using the indicator of Figure 3), these commutators may be stepped from one position to another by a stepping relay responsive to the marking circuit output. In this way, sampling of the respective oscillator frequencies may be somewhat more rapid.

It will be appreciated that the present system offers further advantage in the avoidance of dependence upon any non-linear tube characteristics or upon any absolute voltage or signal levels, but rather utilizes a fundamental absolute linear system of ratio modulation whose accuracy is not affected to any first order of magnitude by such factors as vacuum tube aging, power supply variation, temperature drift, etc. which plague present systems.

While the above system has been described with respect to visual representation or recording of data transmitted, such data may also be used to position mechanical elements, such as other types of indicators or controls for mechanical processes, including machine control or vehicle guidance control.

As used herein, the term "synchro" is intended to designate any device for the transmission of angular position data, and includes, without being necessarily limited thereto, such devices as "Selsyns," "Autosyns," "Magnesyns," resolvers and "D.C. Synchros."

It will accordingly be realized that the above description is intended to be illustrative only, and is not to be taken in any way as limiting the scope of the present invention, which is defined solely by the appended claims.

What is claimed is:

1. A multiple-data telemetering system comprising a plurality of low frequency oscillators having respectively different output frequencies, a like plurality of self-synchronous position transmitters, each having a single phase winding and a three-phase winding with first, second, and third winding sections, each of said winding sections having first and second terminals, one of said windings being rotatable, a respective source of signal data to be transmitted coupled to each of said rotatable windings to adjust the position thereof in accordance with said data, each of said single-phase windings being coupled to the output of a respective one of said oscillators to be excited at the frequency thereof, each of said three-phase windings having its three winding sections first terminals interconnected in Y fashion, with all said first winding sections having their second terminals grounded, a pair of channels, one of said channels being coupled between ground and the second terminals of all said second winding sections of said three-phase windings, the other of said channels being coupled between ground and the second terminals of all said third winding sections of said three-phase windings, whereby each of said channels bears a position-representatve composite signal having components of each of said oscillator frequencies, an electronic switch coupled to said two channels for alternately transmitting the composite signals of said two channels, said switch comprising a pair of gating tubes having sharp cut-off characteristics, each of said tubes having a control grid, a screen grid and an anode, each of said control grids being coupled to a respective channel, said anodes being directly interconnected, a multivibrator for producing a periodic alternately positive and negative pulsed wave output of a frequency at least ten times that of any of said oscillators, the output of said multivibrator being supplied in respectively opposite polarity to said screen grids and being of sufficient amplitude so that said negative pulses block said tubes when applied to the screen grids thereof, whereby said tubes are alternately blocked and rendered capable of amplification, said control grids having different biases, whereby said tubes produce an output complete position-representative signal of said multivibrator frequency having an upper envelope corresponding to one of said composite signals and a lower envelope corresponding to the other of said composite signals, a frequency modulation radio transmitter coupled to the output of said electronic switch to produce a radio frequency carrier frequency-modulated by said switch output, means for transmitting the output of said radio transmitter to a remote point, a receiver at said remote point adapted to receive said modulated carrier and comprising a detector for deriving said complete position-representative signal from said modulated carrier, a pair of oppositely poled biased clippers coupled to said detector to be supplied with said complete signal to separate said upper and lower modulation envelopes into respective paths, respective low-pass filters coupled to said clippers to suppress said multivibrator frequency and harmonics thereof, whereby the outputs of said filters are respectively said composite signals, a receiver scanning synchro having a three-phase winding, with first, second and third winding sections each having first and second terminals, all said first terminals being connected together, one of said second terminals being grounded, the output of one of said filters being coupled to the second terminal of said second winding section, the output of the other of said filters being coupled to the second terminal of said third winding section, said scanning synchro also having a rotatable single-phase winding, a plurality of further filters each adapted to pass but a respective one of said oscillator frequencies, means sequentially and periodically coupling said further filters to said scanning synchro single-phase winding, each of said filters being coupled thereto for like periods of time, a pulse marking circuit coupled at any instant to that one of said further filters which is coupled to said synchro winding for producing an output pulse at the zero amplitude instant of the component of said composite signal of the pass frequency of said coupled further filter, a motor coupled to said synchro rotatable winding for continuously rotating it at the rate of one revolution for each of said periods of time, a two-phase generator also coupled to said motor to be continuously rotated thereby at said same rate, a cathode ray tube having a trace intensity control electrode and two sets of deflecting plates, said control electrode being coupled to said pulse marking circuit to cause the pulse output thereof to intensify said trace, said deflecting plates being coupled to said generator to produce a circular trace on said tube, said latter coupling including means for producing individual diameters of said circular trace for each of said oscillator frequencies and during each of said time periods.

2. A multiple-data telemetering system comprising a plurality of low frequency oscillators having respectively different output frequencies, a like plurality of self-synchronous position transmitters, each having a single-phase winding and a three-phase winding having a Y connection and three outer terminals, one of said windings being rotatable, a respective source of signal data to be transmitted coupled to each of said rotatable windings to adjust the position thereof in accordance with said data, each of said single-phase windings being coupled to the output of a respective one of said oscillators to be excited at the frequency thereof, a pair of channels, each coupled between two of said outer terminals, whereby each of said channels bears a position-representative composite signal having components of each of said oscillator frequencies, an electronic switch coupled to said two channels for alternately transmitting the composite signals of said two channels as the respective upper and lower envelopes of a sub-carrier, a frequency modulation radio transmitter coupled to the output of said electronic switch to produce a radio frequency carrier frequency-modulated by said switch output, a receiver at a remote point adapted to receive said modulated carrier and comprising a detector for deriving said complete position-representative signal from said modulated carrier, a pair of oppositely poled biased clippers coupled to said detector to be supplied with said complete signal to separate said upper and lower modulation envelope signals into respective paths, respective low-pass filters coupled to said clippers to receive said respective path signals to suppress said multivibrator frequency and harmonics thereof, whereby the output of said filters are respectively said composite signals, a receiver scanning synchro having a three-phase winding having a Y connection with three outer terminals and also having a single-phase winding, one of said windings being rotatable, the outputs of said filters being coupled to respective pairs of said outer terminals, a plurality of further filters each adapted to pass but a respective one of said oscillator frequencies, means sequentially and periodically coupling said further filters to said scanning synchro single-phase winding, each of said filters being coupled thereto for like periods of time, a pulse marking circuit coupled at any instant to that one of said further filters which is coupled to said synchro winding for producing an output pulse at the zero amplitude instant of the component of said composite signal of the pass frequency of said coupled further filter, a motor coupled to said synchro rotatable winding for continuously rotating it at the rate of one revolution for each of said periods of time, and means for indicating the phase of said marking circuit output during each of said time periods.

3. A multiple-data telemetering system comprising a plurality of low frequency oscillators having respectively different output frequencies, a like plurality of self-synchronous position transmitters, each having a single phase winding and a three-phase winding having a Y connection and three outer terminals, one of said windings being rotatable, a respective source of signal data to be transmitted coupled to each of said rotatable windings to adjust the position thereof in accordance with said data, each of said single phase windings being coupled to the output of a respective one of said oscillators to be excited at the frequency thereof, a pair of channels, each coupled between two of said outer terminals, whereby each of said channels bears a position-representative composite signal having components of each of said oscillator frequencies, means for transmitting said two composite signals to a remote point, and a receiver at said remote point, comprising a receiver scanning synchro having a three-phase winding with a Y connection with three outer terminals and also having a single-phase winding, one of said windings being rotatable, means applying each of said composite signals between respective pairs of said outer terminals, a plurality of further filters each adapted to pass but a respective one of said oscillator frequencies, a pulse marking for producing an output pulse at the instant its input passes through zero, means sequentially and periodically coupling said filters between said scanning synchro single phase winding and said marking circuit for equal periods of time, whereby for each such period said circuit is responsive only to one of said oscillator frequencies, a motor coupled to said synchro rotatable winding for continuously rotating it at the rate of one revolution for each of said periods of time, and means for indicating the phase of said marking circuit output during each of said time periods.

4. A multiple-data telemetering system comprising a plurality of low frequency oscillators having respectively different output frequencies, a plurality of sources of signal data to be transmitted, a plurality of variable transformer means each having a first winding excited by each of said oscillators and movable in response to a respective data source for producing from a second winding a pair of signals whose ratio represents the data of such source, a pair of channels, means supplying one signal of each pair to one of said channels and the other signal of each pair to the other channel, whereby each of said channels bears a position-representative composite signal having components of each of said oscillator frequencies, means for transmitting said two composite signals to a remote point, and a receiver at said remote point comprising a receiver variable transformer means similar to said first variable transformer means, means supplying said composite signals to said receiver variable transformer means second winding, a plurality of further filters each adapted to pass but a respective one of said oscillator frequencies, a pulse marking for producing an output pulse at the instant its input passes through zero, means sequentially and periodically coupling said filters between said receiver transformer means first windings and said marking circuit for equal periods of time, means continuously rotating said latter first winding at the rate of one cycle in each of such time periods, and means for indicating the phase of said marking circuit output during each of said time periods.

5. A multiple-data telemetering system comprising a plurality of low frequency oscillators having respectively different output frequencies, a plurality of sources of data signal to be transmitted, respective means each excited by one of said oscillators and responsive to a respective data signal source for producing a respective ratio-modulated data-representative pair of signals, means combining one signal from each of said pairs of signals to form a first composite signal, means combining the other signal from each of said pairs of signals to form a second composite signal, means for transmitting said two composite signals to a remote point, and a receiver at said remote point comprising a variable transformer having a pair of polyphase winding connections and a relatively rotatable single-phase winding, means supplying said received composite signals respectively to said winding connections, means continuously rotating said single-phase winding relative to said polyphase winding, and means including a plurality of filters adapted respectively to pass said oscillator frequencies and coupled to said single-phase winding for separately indicating the null signal condition of said single-phase winding at each of said frequencies.

6. A multiple-data telemetering system comprising means for producing a plurality of pairs of signals of different frequencies, the ratio of the signals of each pair being representative of a respective set of data to be transmitted, means combining one signal from each pair to form a first composite signal, means combining the other signal from each pair to form a second composite signals, means for transmitting said two composite signals to a remote point, and a receiver at said remote point comprising a variable transformer having a pair of polyphase winding connections and a relatively rotatable single-phase winding, means supplying said received composite signals respectively to said polyphase winding connections, means continuously rotating said single-phase winding relative to said polyphase winding, and means separately indicating the null signal condition of said rotatable winding at each of said different frequencies.

7. A multiple-data telemetering system comprising a source of first signal to be transmitted, a source of second signal to be transmitted, an electronic switch coupled to said sources for alternately transmitting said first and second signals, said switch comprising a pair of gating tubes having sharp cut-off characteristics, each of said tubes having a control grid, a screen grid and an anode, each of said control grids being coupled to a respective source, said anodes being directly interconnected, a multivibrator for producing a periodic alternately positive and negative pulsed wave output of a frequency at least ten times that of any of said signals, the output of said multivibrator being supplied in respectively opposite polarity to said screen grids and being of sufficient amplitude so that said negative pulses block said tubes when applied to the screen grids thereof, whereby said tubes are alternately blocked and rendered capable of amplification, said control grids having different biases, whereby said tubes produce an output complete signal of said multivibrator frequency having an upper envelope corresponding to one of said source signals and a lower envelope corresponding to the other of said source signals, means for transmitting said complete signal to a remote point, a receiver at said remote point adapted to derive a reproduction of said complete signal, a pair of oppositely poled biased clippers coupled to said receiver to be supplied with said complete signal to separate said upper and lower modulation envelopes into respective paths, and respective low-pass filters coupled to said clippers to suppress said multivibrator frequency and harmonics thereof, whereby the outputs of said filters are respectively said source signals.

8. A multiple-data telemetering system comprising a source of first signal to be transmitted, a source of second signal to be transmitted, an electronic switch coupled to said sources for alternately transmitting said first and second signals, said switch comprising a pair of gating tubes having sharp cut-off characteristics and coupled respectively to said sources, means for alternately placing said tubes in amplifying and blocked condition, means for combining the outputs of said tubes, said tubes being differently biased to produce different upper and lower envelopes of their combined output corresponding respectively to said first and second signals, means for transmitting said combined output to a remote point, a receiver at said remote point adapted to derive a reproduction of said combined output, a pair of oppositely poled biased clippers coupled to said detector to be supplied with said combined output reproduction to separate said upper and lower modulation envelopes into respective paths, and respective low-pass filters coupled to said clippers to suppress said multivibrator frequency and harmonics thereof, whereby the outputs of said filters are respectively said source signals.

9. A multiple-data telemetering system comprising a source of first signal to be transmitted, a source of second signal to be transmitted, a source of sub-carrier, means for modulating half-cycles of said sub-carrier source of one polarity by said first signal and half-cycles of opposite polarity by said second signal, means for transmitting said modulated signal to a remote point, a receiver at said remote point adapted to derive a reproduction of said modulated signal, and means for separating positive and negative portions of said modulated signal to reconstitute said first and second signals.

10. A multiple-data telemetering apparatus comprising a plurality of low frequency oscillators having respectively different output frequencies, a like plurality of self-synchronous position transmitters, each having a single-phase winding and a three-phase winding, with first, second, and third winding sections, each of said winding sections having first and second terminals, one of said windings being rotatable, a respective source of signal data to be transmitted coupled to each of said rotatable windings to adjust the position thereof in accordance with said data, each of said single phase windings being coupled to the output of a respective one of said oscillators to be excited at the frequency thereof, each of said three-phase windings having its three winding sections first terminals interconnected in Y fashion, with all said first winding sections having their second terminals grounded, a pair of channels, one of said channels being coupled between ground and the second terminals of all said second winding sections of said three-phase windings, the other of said channels being coupled between ground and the second terminals of all said third winding sections of said three-phase windings, whereby each of said channels bears a position-representative composite signal having components of each of said oscillator frequencies.

11. A multiple-data telemetering apparatus comprising a plurality of low frequency oscillators having respectively different output frequencies, a like plurality of self-synchronous position transmitters, each having a single-phase winding and a polyphase winding having three outer terminals, one of said windings being rotatable, a respective source of signal data to be transmitted coupled to each of said rotatable windings to adjust the position thereof in accordance with said data, each of said single-phase windings being coupled to the output of a respective one of said oscillators to be excited at the frequency thereof, a pair of channels, each coupled between two of said outer terminals, whereby each of said channels bears a position-representative composite signal having components of each of said oscillator frequencies.

12. A multiple-data telemetering apparatus comprising a plurality of low frequency oscillators having respectively different output frequencies, a plurality of sources of signal data to be transmitted, variable transformer means having a first winding excited by each of said oscillators and movable in response to a respective data source for producing from a second winding a pair of signals whose ratio represents the data of such source, a pair of channels, means supplying one signal of each pair to one of said channels and the other signal of each pair to the other channel, whereby each of said channels bears a position-representative composite signal having components of each of said oscillator frequencies.

13. A multiple-data telemetering apparatus comprising a plurality of fixed low frequency oscillators having respectively different output frequencies, a plurality of sources of signal data to be transmitted, respective means each excited by one of said oscillators and responsive to a respective data source for producing a respective ratio-modulated data-representative pair of signals each of said ratio-modulated data representative pair of signals having a first signal and a second signal, said first and second signals having the same frequency and bearing an amplitude ratio to one another proportional to said data to be transmitted, means combining one signal from each pair to form a first composite signal, means combining the other signal from each pair to form a second composite signal, means for utilizing said two composite signals.

14. A receiver for two composite ratio-modulation signals each having components of a plurality of frequencies, comprising a receiver scanning synchro having a three-phase winding, with first, second and third winding sections each having first and second terminals, all said first terminals being connected together, one of said second terminals being grounded, one of said composite signals being coupled to the second terminal of said second winding section, the other of said composite signals being coupled to the second terminal of said third winding section, said scanning synchro also having a rotatable single-phase winding, a plurality of further filters each adapted to pass but a respective one of said oscillator frequencies, means sequentially and periodically coupling said further filters to said scanning synchro single-phase winding, each of said filters being coupled thereto for like periods of time, a pulse marking circuit coupled at any instant to that one of said further filters which is coupled to said synchro winding for producing an output pulse at the zero amplitude instant of the component of said composite signal of the pass frequency of said coupled further filter, a motor coupled to said synchro rotatable winding for continuously rotating it at the rate of one revolution for each of said periods of time, a two-phase generator also coupled to said motor to be continuously rotated thereby at said same rate, a cathode ray tube having a trace intensity control electrode and two sets of deflecting plates, said control electrode being coupled to said pulse marking circuit to cause the pulse output thereof to intensify said trace, said deflecting plates being coupled to said generator to produce a circular trace on said tube, said latter coupling including means for producing individual diameters of said circular trace for each of said oscillator frequencies and during each of said time periods.

15. A receiver for two composite ratio-modulation signals each having components of a plurality of frequencies, comprising a receiver scanning synchro having a three-phase winding having a Y connection with three outer terminals and also having a single-phase winding, said signals being coupled to respective pairs of said outer terminals, a plurality of filters each adapted to pass but a respective one of said oscillator frequencies, means sequentially and periodically coupling said filters to said scanning synchro single-phase winding, each of said filters being coupled thereto for like periods of time, a pulse marking circuit coupled at any instant to that one of said filters which is coupled to said synchro winding for producing an output pulse at the zero amplitude instant of the component of said composite signal of the pass frequency of said coupled filter, a motor coupled to said synchro rotatable winding for continuously rotating it at the rate of one revolution for each of said periods of time, and means for indicating the phase of said marking circuit output during each of said time periods.

16. A receiver for two composite ratio-modulation signals each having components of a plurality of frequencies, comprising a receiver scanning synchro having a three-phase winding having a Y connection with three outer terminals and also having a single-phase winding, one of said windings being rotatable, means applying each of said composite signals between respective pairs of said outer terminals, a pulse marking circuit for producing an output pulse at the instant its input passes through zero, means sequentially and periodically applying a single-frequency component of said single-phase winding output to said marking circuit to produce respective single-component-representative pulses, and means for indicating the phase of each of said latter pulses.

17. A receiver for two composite ratio-modulation signals each having components of a plurality of frequencies comprising a variable transformer means having relatively rotatable single-phase and polyphase windings, means supplying said signals to said polyphase winding, a plurality of filters each adapted to pass but a respective one of said oscillator frequencies, a pulse marking circuit for producing an output pulse at the instant its input passes through zero, means sequentially and periodically coupling said filters between said receiver transformer means single-phase winding and said marking circuit for equal periods of time, whereby for each such period said circuit is responsive only to one of said oscillator frequencies, means continuously rotating said single-phase winding at the rate of one cycle in each of such time periods, and means for indicating the phase of said marking circuit output during each of said time periods.

18. A receiver for two composite ratio-modulation signals each having components of a plurality of frequencies comprising a variable transformer having a pair of polyphase winding connections and a relatively rotatable single-phase winding, means supplying said received composite signals respectively to said winding connections, means continuously rotating said single-phase winding relative to said polyphase winding, and means including a plurality of filters adapted respectively to pass said oscillator frequencies and coupled to said single-phase winding for separately indicating the null signal condition of said single-phase winding at each of said frequencies.

19. A receiver for two composite ratio-modulation signals each having components of a plurality of frequencies, comprising a variable transformer having a pair of polyphase winding connections and a relatively rotatable single-phase winding, means supplying said received composite signals respectively to said winding connections, means continuously rotating said single-phase winding relative to said polyphase winding, and means separately indicating the null signal condition of said rotatable winding at each of said different frequencies.

20. A multiple-data telemetering system comprising means for producing a plurality of pairs of signals of different fixed frequencies, the signals of each pair having the same frequency and the ratio of the signals of each pair being representative of a respective set of data to be transmitted, means combining one signal from each pair to form a first composite signal, means combining the other signal from each pair to form a second composite signal, means for transmitting said two composite signals to a remote point, and a receiver at said remote point comprising a movable scanner element responsive to said received composite signals for producing an output signal having components of each of said frequencies varying in amplitude syntonically with said scanner element position and each component having a null value at a position of said scanner element representative of a respective set of said data being transmitted, and means separately indicating the null condition of said scanner element output signal at each of said different frequencies to indicate said transmitted data.

21. A receiver position indicator for two ratio-modulation signals each having components of a plurality of frequencies, the ratio of components of like frequency being representative of the received data, comprising a variable transformer having a pair of polyphase winding connections and a relatively rotatable single-phase winding, said connections being excited respectively by said signals, means continuously rotating one of said windings relative to the other, and means for indicating the null signal condition of said single-phase winding at each of said frequencies.

22. A receiver indicator as in claim 21, wherein said last means comprises an element rotated in synchronism with said rotatable winding, and means for indicating the position of said element at the instant of occurrence of said null condition.

23. A receiver indicator as in claim 20, wherein said element comprises a printer roll, and said position-indicating means comprises an imprintable medium juxtaposed to said roll, and a striker element actuated in response to said null condition for pressing said medium and roll together to imprint a record on said medium.

24. A receiver indicator as in claim 20, wherein said element comprises an opaque pointer, and said position-indicating means comprises a persistently luminescent screen on one side of said pointer, a light source on the other side thereof, and means momentarily exciting said light source at each said null.

25. A multiple-data telemetering apparatus comprising a plurality of low frequency oscillators having respectively different fixed output frequencies, a plurality of different sources of data to be transmitted, respective transducers coupled to said oscillators and said sources for producing respective data-representative signals respectively of said frequencies, each such signal having a polarity and magnitude corresponding to the sense and magnitude of deviation of its respective data source from a datum condition, first and second channels, means combining said data-representative signals into a first composite signal, means combining said oscillator outputs into a second composite signal, means simultaneously amplifying said first composite signal substantially to the level of said second composite signal, means supplying said amplified first composite signal to said first channel and said second composite signal to said second channel.

26. A receiver for two composite signals each having components of a plurality of frequencies, the ratio of the components of like frequency being representative of data being received, comprising a synchro having polyphase input connections and relatively movable single phase output connections, means supplying said received composite signals to said polyphase connections, means moving said output connections relative to said input connections, and means separately indicating at each of said frequencies the null condition of the signal derived from said output connections.

References Cited in the file of this patent

UNITED STATES PATENTS

| | | |
|---|---|---|
| 1,600,204 | Alexanderson | Sept. 14, 1926 |
| 1,906,269 | Hough | May 2, 1933 |

(Other references on following page)

UNITED STATES PATENTS

| | | |
|---|---|---|
| 2,173,496 | Schlesinger | Sept. 19, 1939 |
| 2,256,482 | Isbister | Sept. 23, 1941 |
| 2,409,560 | Haight | Oct. 15, 1946 |
| 2,538,065 | Wallace | Jan. 16, 1951 |
| 2,555,166 | Uehling | May 29, 1951 |
| 2,556,556 | Schmitt et al. | June 12, 1951 |
| 2,596,147 | Hampton et al. | May 13, 1952 |

FOREIGN PATENTS

| | | |
|---|---|---|
| 400,289 | Great Britain | Oct. 26, 1933 |
| 975,183 | France | May 2, 1951 |